United States Patent [19]

McGuire

[11] 4,068,713
[45] Jan. 17, 1978

[54] PLASTIC WELL SCREEN

[75] Inventor: John S. McGuire, Olathe, Kans.

[73] Assignee: UOP Inc., Des Plaines, Ill.

[21] Appl. No.: 748,809

[22] Filed: Dec. 8, 1976

[51] Int. Cl.$^2$ ............................................. E21B 43/08
[52] U.S. Cl. .................................... 166/233; 210/497.1
[58] Field of Search ................................. 166/227–238;
210/497.1, 460, 461; 29/163.5 CW; 138/132;
175/314; 61/10–13

[56] References Cited

U.S. PATENT DOCUMENTS

| | | | |
|---|---|---|---|
| 669,129 | 3/1901 | Stukes | 210/497.1 X |
| 2,046,459 | 7/1936 | Johnson | 166/233 |

FOREIGN PATENT DOCUMENTS 1,064,482  5/1954  France .............................. 210/497.1

Primary Examiner—Ernest R. Purser
Attorney, Agent, or Firm—James R. Hoatson, Jr.; Barry L. Clark; William H. Page, II

[57] ABSTRACT

Improved plastic well screen is stronger and more economical to produce than prior art screens. An extruded inner core member has a generally corrugated or fluted configuration with the radial walls each including stepped right angled portions for increasing the rigidity of the core. An enwrapment wire is welded to the core to define the screen slots. Channels in the core permit flow even when a pumping means occludes the I.D. of the core.

5 Claims, 2 Drawing Figures

PLASTIC WELL SCREEN

BACKGROUND OF THE INVENTION

The invention relates to well screens, whose principal purpose is to restrain sand, gravel or other particulate matter from entering water pumps and distribution systems. Most screens capable of restraining fine "flour" sands are made by the spiral wrap process, in which a continuous wire is helically wound about an internal cylindrical supporting structure. Each turn of the wire is separated from the preceding turn by a gap, or "slot" whose width determines the size of the particles restrained.

In spiral wrapped metal screens of the type disclosed in Johnson U.S. Pat. No. 2,046,058, the inner structure is a plurality of rods axially aligned and radially disposed and attached to the inner surfaces of the enwrapment. The enwrapping wire and the slot adjacent thereto are both continuous. The inner rods offer little or no obstruction to inward flow, thus maintaining high slot efficiency. The spiral wrap process has proven to be the most efficient system of fine slot generation.

In recent years the cost, scarcity and processing expense of metals for casing and screens has spurred the use of synthetic polymers as substitutes for metals. It is known in the arts that the modulus of elasticity of the commodity priced plastics range from 300,000 to 500,000 psi. Since this is roughly 1/60th of the stiffness of steel and its alloys, a facsimile reproduction of a steel product in plastics will result in a far weaker product, possibly unacceptable for equivalent usage.

The many plastic screens available divide in two general groups: 1. Modification of bare pipe by saw slots, grinding, drilling or milling to produce water passages. Usually this group of screens have no reverse draft to facilitate the passage of small particulate matter to reduce blockage. 2. Composite screens. In this group, a pipe slotted or drilled to provide passage is overwrapped with plastic wire to generate fine slots. Most screens of this type have very low effective slot area, one exception being the screen disclosed in U.S. Pat. No. 3,211,819 which comprises a wire wrapped around a perforated tubular core.

SUMMARY

It is among the objects of this invention to disclose a novel well screen and a method of making it which retains the functional efficiency of the original Johnson welded metal screen, and provides valuable features not found in known plastic screens.

The improved screen has only two component parts, an inner core and an outer helicap wrap. The inner core may be made from a vacuum formed sheet comprising alternate opposing channel-like corrugations which may then be rolled and bonded into tubular form. However, in the preferred mode, the inner core would be extruded. The alternating channel-like corrugations would appear as flutes, with each outwardly projecting flute being adjacent to an inwardly projecting one as in a splined shaft.

Defining the most inward portion of an inward flute on the core as the "base" and the outward portion of an outward flute as the "top", the manufacturing process would proceed as follows: A fluted tube or core would be extruded, vacuum sized, cooled and automatically drilled through the bottoms of the inward flutes. The sum of the areas of the holes in the core should be greater than the relative area of the super-imposed slots in the enwrapment to permit maximum inlet flow during normal opertion and insure even pressure on the enwrapment during any backwashing operation. The topmost corners of the flutes are inverted inwardly, providing six right angle sections at the top of the outward flute for maximum rigidity and columnar support. The rib-like portions between the topmost right angles define the contact point and bonding area for the enwrapment.

The bases of the inward flutes or inner rib-like portions determine the I.D. of the screen. The O.D. of the screen is a function of the height of the flutes and the height of the wire enwrapment, less the depth of penetration of the bond. O.D. sizing is maintained by a guiding and sizing shoe, positioned backwardly tangent to the bonding means and opposed by two rollers on the opposite side of the turning screen.

In making the screen, the fluted core may be rotated away from the wire source, drawing the wire across the bonding areas where the bond is made. In this method of wire application, the wire, already under tension, imparts a pretensioned load upon the core. In another method, the wire would be driven to the point of bonding so that the driving push of the wire against the guide shoe would tend to curve the wire outward and under compression, thus forming an outward precompression between points of attachment. This action creates the cosmetic effect of a cylindrical rather than polygonal shape similar to that achieved in U.S. Pat. No. 3,875,977. The action also imposes a prestressed condition that must be overcome before inward deflection toward collapse can occur.

The enwrapping wire can be bonded to the tops of the outward ribs or flutes by adhesives, electro-magnetic adhesion, sonic welding or solvent welding. Sonic welding is the preferred bonding method. With the driven wire, previbration of the wire can be had before tangency contact is made. The area of contact is a line permitting rapid vibrational heat of fusion. As the flat surface of the top of the flute continues to rotate under the welding horn, the weld progresses across the surface of the bonding area. With both pressure and power control of the sonic welder and speed of rotation control of the core, harmful heat distortion or excessive weld penetration can be controlled. With adequate means of tranversing the core relative to the winding and bonding means, the uniformity of a desired slot can be maintained without wire pinching or other secondary wire forming.

The disclosed system of flutes will provide channels for vertical flow and distribution through the box beams under the open enwrapment. The flutes under the weldments will provide channels for vertical flow and distribution inside the screen, even when the pumping means substantially occludes the nominal I.D. of the screen. In addition to accommodating flow, the holes in the bottoms of the inward flutes also provide connections for detent means which may be used to simultaneously attach and detach the tranversing means of winders used to make the screen.

DETAILED DESCRIPTION OF THE INVENTION

Figure 1:
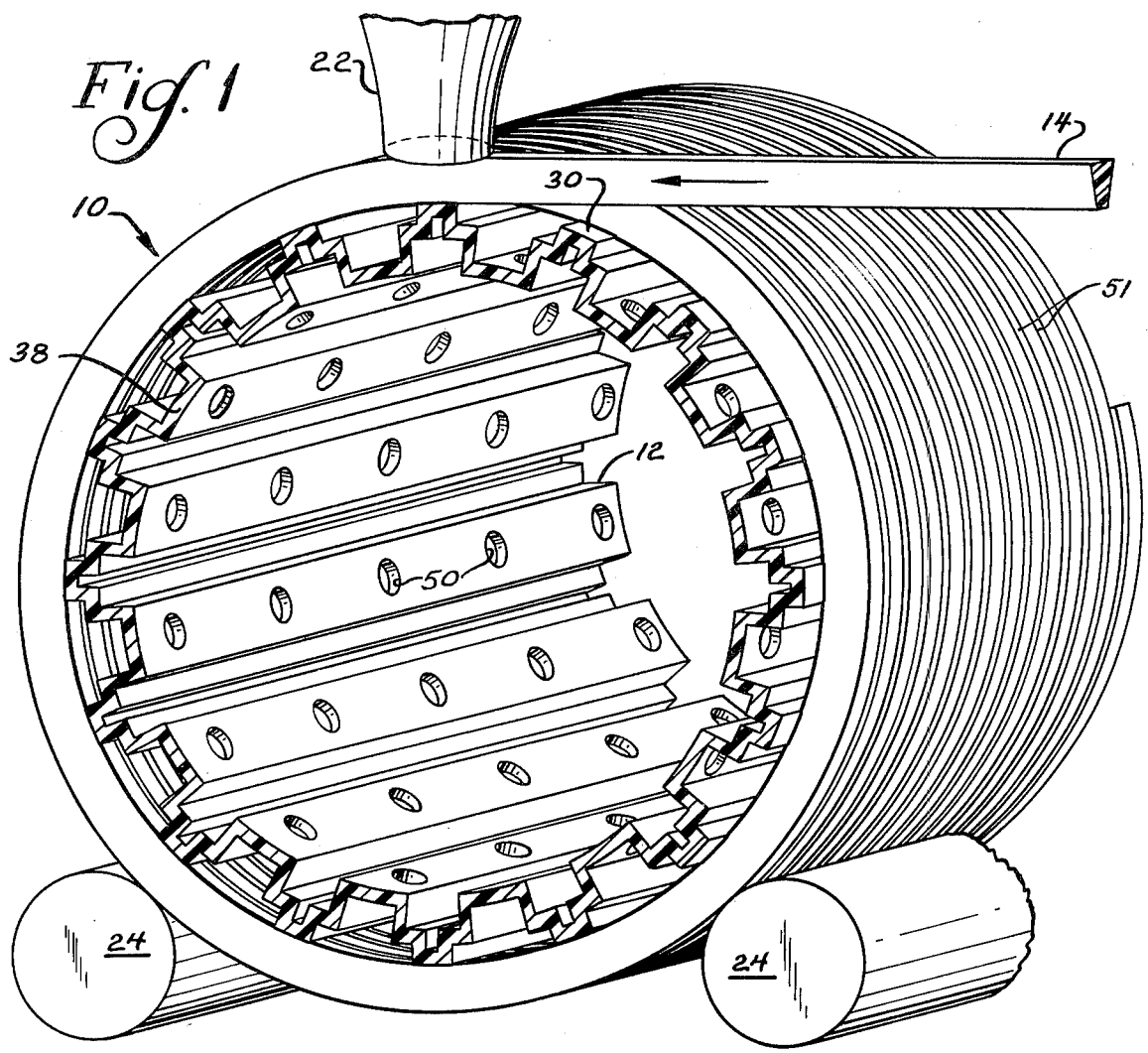
FIG. 1 is a fragmentary isometric cross-sectional view showing the improved well screen being wound.

Referring to FIG. 1, a short length of my improved well screen indicated generally at 10, is illustrated. The screen 10 basically comprises an extruded plastic inner core member 12 and a helical enwrapment of formed plastic wire 14. During manufacture, the core 12 is preferably rotated by a mandrel or other form of drive means (not shown) to cause the wire 14 to be unwound from a supply coil (not shown). As the wire 14 contacts each outer flute or rib 16 on the core 12 it is welded thereto, as indicated by the dotted line 18 in FIG. 2. Although an ultrasonic welding horn 22 is illustrated, which would slightly melt the mating parts and cause a slight embedment, welding could also be done by the use of solvents. Suitable adhesives could also be used. The rollers 24 are preferably provided as part of the welding apparatus and positioned under the screen 10 to support it and to also size it by controlling the depth to which the welding horn 22 can embed the wire wrap 14 and the outer flute portion 28 of the core 12 into each other.

Figure 2:
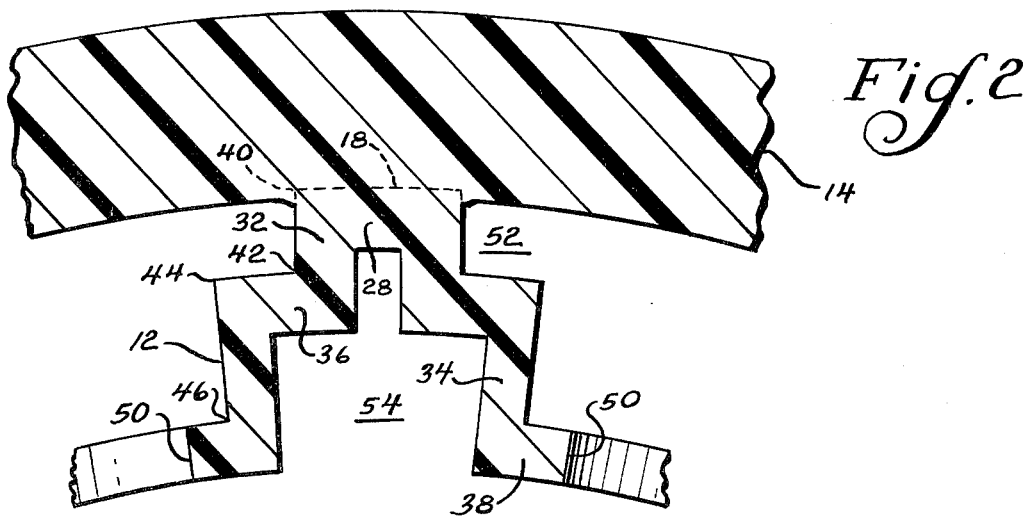
FIG. 2 is an enlarged fragmentary end sectional view of the screen of FIG. 1 after the enwrapment wire has been welded to the core.

The core 12 is preferably extruded of a suitable plastic such as polyvinyl chloride, into the cross-sectional configuration shown in FIGS. 1 and 2. The wire 14 is also preferably extruded from a plastic such as polyvinyl chloride. The core includes an outer edge or rib surface 30 which becomes slightly embedded relative to the wire 14, as indicated by the weld line 18, when the screen is welded. The outer radial wall portions 32 of the core 12 are joined to inner radial wall portions 34 by intermediate wall portions 36. The inner radial wall portions 34 are then joined to inner wall or rib portions 38 which define the I.D. of the core 12. Each of the adjacent wall portions 30, 32, 36, 34 and 38 are integrally joined by a right angled juncture 40, 42, 44 and 46, respectively. Apertures 50 formed in the inner wall portions 38 carry liquid passing through the fine slots 51 between the convolutions of wire 14. The total area of the apertures 50 should exceed the total area of the slots 51. The stepped configuration of the walls contributes greatly to the strength of the screen and its ability to resist axial and radial forces. The configuration also results in relatively narrow lines of contact between the core 12 and the wire 14 which maximizes the area of slots 51 availabe for the flow of liquid. Relieved areas 52 under the wires 14 provide screen slot area which would not be available if the core walls 34 extended all the way to the wires. Channel areas 54 between adjacent inner rib portions 38 permit liquid to pass axially of the screen in the event that a pumping means located inside the screen occludes the openings 50 in the immediately adjacent portions of the walls 38 defining the screen I.D. If pump blockage occurred in a well screen having a smooth I.D., water would not be able to get around the pump.

It will be readily recognized that the disclosed screen provides a very large slot area, which is closely comparable to metal screens made of wound wire welded to axial rods, while utilizing a very small amount of plastic material in its core for a given strength as compared to prior art plastic screens.

I claim as my invention:

1. A plastic well screen comprising a hollow fluted core portion and a formed wire enwrapment portion defining open slots for the passage of liquid, said fluted core portion having spaced apart external rib portions and spaced apart internal rib portions, said internal rib portions each having a series of openings therein for the passage of liquid between the outside and inside of said fluted core portion, said internal rib portions having a width which is greater than the width of the external rib portions but less than the width of the space between adjacent pairs of external rib portions, the internal rib portions being joined to the external rib portions by generally radially extending wall portions, the wall portions which extend from the adjacent edges of adjacent internal rib portions cooperating with the inner surface of the external rib portions to define flow channels which are recessed outwardly of the inner surfaces of the internal rib portions.

2. The plastic well screen of claim 1 wherein said internal rib portions are joined to the external rib portions by inner and outer generally radially extending wall portions which are in stepped relation to each other and integrally joined by intermediate connecting wall portions.

3. The plastic well screen of claim 2 wherein each of said generally radially extending wall portions are joined to one of said intermediate connecting wall portions and to one of said rib portions in a right angle juncture.

4. The plastic well screen of claim 3 wherein the total open area of said series of openings in said rib portions is greater than the total open area of said open slots.

5. The plastic well screen of claim 4 wherein said wire enwrapment portion and said external rib portions are partially embedded in each other in integrally welded relationship.

* * * * *